(12) United States Patent
Suzuki

(10) Patent No.: US 8,367,141 B2
(45) Date of Patent: Feb. 5, 2013

(54) INSTANT BLACK TEA CONTAINING GREEN TEA EXTRACT

(75) Inventor: Youichi Suzuki, Tokyo (JP)

(73) Assignee: KAO Corporation, Tokyo (JP)

(*) Notice: Subject to any disclaimer, the term of this patent is extended or adjusted under 35 U.S.C. 154(b) by 0 days.

(21) Appl. No.: 13/518,155

(22) PCT Filed: Dec. 20, 2010

(86) PCT No.: PCT/JP2010/072893
§ 371 (c)(1), (2), (4) Date: Jun. 21, 2012

(87) PCT Pub. No.: WO2011/078119
PCT Pub. Date: Jun. 30, 2011

(65) Prior Publication Data
US 2012/0263857 A1  Oct. 18, 2012

(30) Foreign Application Priority Data

Dec. 21, 2009 (JP) ................................ 2009-289126

(51) Int. Cl.
*A23F 3/00* (2006.01)

(52) U.S. Cl. ........................... 426/597; 426/49; 426/590

(58) Field of Classification Search .................. 426/597, 426/590, 49
See application file for complete search history.

(56) References Cited

U.S. PATENT DOCUMENTS

| 4,680,193 A | * | 7/1987 | Lunder et al. ................. 426/597 |
| 4,748,033 A | * | 5/1988 | Syfert et al. ............... 426/330.3 |
| 5,612,079 A | | 3/1997 | Lunder |
| 6,235,323 B1 | | 5/2001 | Carns et al. |
| 7,279,193 B2 | * | 10/2007 | Oishi et al. ..................... 426/597 |
| 7,829,132 B2 | | 11/2010 | Zhang |
| 2004/0009283 A1 | | 1/2004 | Holmes et al. |
| 2010/0233322 A1 | | 9/2010 | Fukuda et al. |

FOREIGN PATENT DOCUMENTS

| JP | 07 067530 | 3/1995 |
| JP | 7 194303 | 8/1995 |
| JP | 10 304822 | 11/1998 |
| JP | 11 221018 | 8/1999 |
| JP | 11 266841 | 10/1999 |
| JP | 2005 531310 | 10/2005 |
| JP | 2008 518590 | 6/2008 |
| WO | 2009 044559 | 4/2009 |

OTHER PUBLICATIONS

International Search Report issued Feb. 15, 2011 in PCT/JP2010/072893 Filed Dec. 20, 2010.

* cited by examiner

*Primary Examiner* — Anthony Weier
(74) *Attorney, Agent, or Firm* — Oblon, Spivak, McClelland, Maier & Neustadt, L.L.P.

(57) ABSTRACT

Provided is an instant black tea, which includes the non-polymer catechins at high concentration, is further reduced in bitterness and astringency, and is excellent in the appearance of its infusion. The instant black tea includes a beverage material containing black tea leaves and a dried green tea extract and sealed in a tea bag. A mass ratio of the non-polymer catechins/tannin in the beverage material is from 0.65 to 0.95.

7 Claims, No Drawings

INSTANT BLACK TEA CONTAINING GREEN TEA EXTRACT

FIELD OF THE INVENTION

This invention relates to an instant black tea containing the non-polymer catechins at high concentration.

BACKGROUND OF THE INVENTION

Reflecting diversification of consumer's tastes and ever-growing health consciousness of consumers, various tea beverages have been put on the market in recent years. As one of such tea beverages, there is instant tea that can be readily taken by simply placing it in a drinking vessel such as a cup and pouring hot water without needing to use a kyusu (Japanese teapot), teapot or the like.

Proposed instant teas include, for example, an instant tea soluble in cold water, which is obtained by concentrating and drying an extract solution extracted from a blend of black tea leaves and green tea leaves with hot water under 1 to 2 atm (Patent Document 1), an instant tea prepared by drying a tea extract solution obtained from steamed leaves prepared by heating fresh tea leaves with steam (Patent Document 2), and a tea bag for an iced tea beverage, which contains a mixture made up of from 30 to 95 wt % of tea leaves and from 5 to 70 wt % of dried soluble tea solids (Patent Document 3).

However, these conventional instant teas give a sensation of bitterness and astringency attributable to components intrinsic to tea, such as the non-polymer catechins and tannin. Also, any attempt to ingest the non-polymer catechins at high concentration leads to further increase bitterness and astringency thereof.

Proposed, therefore, as instant teas with reduced bitterness include, for example, a processed tea product with a processed tea, which contains (A) a purified green tea extract obtained by dissolving and extracting a green tea extract in a mixed solution of ethanol and water at a mass ratio of from 99/1 to 75/25 and (B) tea leaves at a solids mass ratio [(A)/(B)] of from 10/90 to 90/10, and which is sealed in a tea bag (Patent Document 4).

[Patent Document 1] JP-A-07-194303
[Patent Document 2] JP-A-10-304822
[Patent Document 3] JP-A-11-221018
[Patent Document 4] WO-A-2009/044559

SUMMARY OF THE INVENTION

This invention provides an instant black tea including a beverage material including black tea leaves and a dried green tea extract and sealed in a tea bag, wherein a mass ratio of the non-polymer catechins/tannin in the beverage material is from 0.65 to 0.95.

DETAILED DESCRIPTION OF THE INVENTION

The processed tea product described in Patent Document 4 makes it possible to provide a tea beverage with reduced bitterness despite the inclusion of the non-polymer catechins at high concentration. For continued ingestion over a long term, however, it is required to prepare it as a palatable instant tea by further reducing bitterness and astringency.

The present invention, therefore, provides an instant black tea, which contains the non-polymer catechins at high concentration, is further reduced in bitterness and astringency, and is excellent in the appearance of its infusion.

The present inventors conducted research on bitterness and astringency components contained in green tea extracts and black tea leaves. As a result, it has been found that an instant black tea, which is further reduced in bitterness and astringency and is excellent in appearance despite the inclusion of the non-polymer catechins at high concentration, can be obtained by controlling the content mass ratios of specific components in a beverage material which contains a dried green tea extract and black tea leaves and is to be sealed in a tea bag.

According to the present invention, an instant black tea can be provided, which is further reduced in bitterness and astringency and is excellent in the appearance of its infusion despite the inclusion of the non-polymer catechins at high concentration. As the instant black tea according to the present invention makes it possible to readily ingest, with water or hot water, the non-polymer catechins at high concentration without requiring the trouble of extracting tea leaves with a kyusu (Japanese teapot), teapot or the like, the physiological effects by the non-polymer catechins can be fully expected by their continued ingestion.

The instant black tea according to the present invention includes a beverage material sealed in a tea bag, and as the beverage material, contains black tea leaves and a dried green tea extract. The mass ratio of the non-polymer catechins/tannin in the beverage material is from 0.65 to 0.95. From the viewpoints of reductions in bitterness and astringency and an improvement in appearance, the lower limit thereof may be preferably 0.7, more preferably 0.75, even more preferably 0.8, and the upper limit thereof may be preferably 0.93, more preferably 0.9.

The term "the mass ratio of the non-polymer catechins/tannin in the beverage material" as used herein is based on the contents of the non-polymer catechins and tannin contained in an extract solution when the beverage material separated from an instant black tea needed for a cup is extracted for 5 minutes with hot water of 90° C. in an amount 100 times the mass of the beverage material. The term "the non-polymer catechins" is a generic term, which collectively encompasses non-epi-form catechins such as catechin, gallocatechin, catechin gallate and gallocatechin gallate, and epi-form catechins such as epicatechin, epigallocatechin, epicatechin gallate and epigallocatechin gallate. The concentration of the non-polymer catechins is defined based on the total amount of the above-described eight non-polymer catechins. Further, the term "tannin" is a concept that embraces the non-polymer catechins and their ester derivatives (for example, gallic acid esters), and condensates thereof.

Concerning the instant black tea according to the present invention, the content of the non-polymer catechins in an infusion may be preferably 200 mg/100 mL or higher, more preferably 230 mg/100 mL or higher, even more preferably 250 mg/100 mL or higher when the instant black tea needed for a cup (for a tea bag) is infused for 2 minutes in 200 g of hot water of 90° C. Insofar as the content of the non-polymer catechins in an infusion obtained under such conditions as described above is 200 mg/100 mL or higher, it is possible to avoid excess infusing so that the bitterness and astringency upon drinking can be further reduced. Moreover, the non-polymer catechins can be readily ingested in a large amount so that the physiological effects by the non-polymer catechins can be fully expected. It is to be noted that the upper limit of the content of the non-polymer catechins may be set preferably at 600 mg/100 mL, more preferably 500 mg/100 mL, even more preferably at 400 mg/100 mL from the standpoints of reductions in bitterness and astringency.

Concerning the mass ratio of the non-polymer catechins/tannin in the black tea leaves, its lower limit may be preferably 0.2, more preferably 0.3, even more preferably 0.4, and its upper limit may be preferably 0.9, more preferably 0.8, even more preferably 0.7, from the viewpoints of reductions in bitterness and astringency and an improvement in appearance.

With respect to the content of the non-polymer catechins in the black tea leaves, its lower limit may be preferably 4 mass %, more preferably 4.5 mass %, even more preferably 5 mass %, and its upper limit may be preferably 10 mass %, more preferably 9 mass %, even more preferably 8.5 mass %, from the viewpoints of reductions in bitterness and astringency and an improvement in appearance.

In the present specification, the terms "the content of the non-polymer catechins", "the content of tannin" and "the mass ratio of the non-polymer catechins/tannin" in black tea leaves are based on the contents of the non-polymer catechins and tannin contained in an extract solution when extracted for 5 minutes with hot water of 90° C. in an amount 100 times the mass of the black tea leaves.

As black tea leaves having such properties as described above, Nuwara Eliya, Uva, Dimbula, Darjeeling, Assam and Ceylon may be mentioned as examples. They may be used either singly or as a combination of two or more. Among these black tea leaves, Nuwara Eliya, Uva and Dimbula are preferred, with Nuwara Eliya and Uva being more preferred, from the viewpoint of a further reduction in bitterness.

Commercially-available black tea leaves may be used insofar as they have the above-described properties. From the viewpoint of extraction efficiency, however, it is preferable to use the black tea leaves controlled to a predetermined size. The size of black tea leaves may be preferably from 0.5 to 2 mm, more preferably from 0.7 to 1.5 mm. Such black tea leaves can be collected, for example, by milling commercially-available black tea leaves as needed and then sieving them. The term "the size of black tea leaves" as used herein means the size of a sieve aperture to give a particle size at 50% of integration value when by using sieves of different aperture sizes, the ratio of particles passing through the respective aperture sizes (the particle size distribution) are measured.

On the other hand, no particular limitation is imparted to the dried green tea extract insofar as it is one obtained by drying at least one green tea extract selected from a green tea extract solution, its concentrate (which may hereinafter be called "the concentrated green tea extract solution") and purified products thereof. In the tea bag, the dried green tea extract may exist in a state of being independent from the black tea leaves, in a state of covering surfaces of the black tea leaves and being integral with them, or as a blend with the black tea leaves. The shape of the dried green tea extract is not specifically limited, and may be any desired shape such as a spherical shape, plate shape, needle shape or irregular shape.

With respect to the mass ratio of the non-polymer catechins/tannin in the dried green tea extract, its lower limit may be preferably 0.83, more preferably 0.9, even more preferably 0.95, and its upper limit may be preferably 1.3, more preferably 1.2, even more preferably 1.1, from the viewpoints of reductions in bitterness and astringency.

In regard to the content of the non-polymer catechins in the dried green tea extract, its lower limit may be preferably 40 mass %, more preferably 45 mass %, more preferably 50 mass %, more preferably 55 mass %, even more preferably 60 mass %, and its upper limit may be 100 mass %, from the viewpoints of reductions in bitterness and astringency and an improvement in appearance. From the economical viewpoint, however, the upper limit may be preferably 95 mass %, more preferably 90 mass %. It is to be noted that the term "the content of the non-polymer catechins in the dried green tea extract" means a value determined by the equation (I) described in Examples to be described subsequently herein.

From the viewpoints of further reductions in bitterness and astringency, the ratio of gallate forms in the non-polymer catechins in the dried green tea extract may have a lower limit of preferably 5 mass %, more preferably 8 mass % even more preferably 10 mass %, and may have an upper limit of preferably 55 mass %, more preferably 50 mass %, even more preferably 45 mass %. The term "gallate forms of the non-polymer catechins (hereinafter also called simply "gallate forms")" as used herein is a generic term, which collectively encompasses catechin gallate, gallocatechin gallate, epicatechin gallate, epigallocatechin gallate or the like, and the term "the ratio of gallate forms in the non-polymer catechins" indicates the mass ratio of the four gallate forms based on the total amount of the non-polymer catechins.

In the instant black tea according to the present invention, the black tea leaves and the dried green tea extract are preferably blended such that the total content of the non-polymer catechins per 13 g of the beverage material becomes preferably from 280 to 1,200 mg, more preferably from 400 to 1,200 mg, more preferably from 500 to 1,000 mg, even more preferably from 550 to 800 mg. Such a blend ratio makes it possible to easily infuse the non-polymer catechins at high concentration. The term "the total content of the non-polymer catechins" as used herein means the total amount of the non-polymer catechins in the green tea extract and the non-polymer catechins in the black tea leaves.

In the instant black tea according to the present invention, a cyclic oligosaccharide may be incorporated thereto. As cyclic oligosaccharides, $\alpha$-, $\beta$- and $\gamma$-cyclodextrins and branched $\alpha$-, $\beta$- and $\gamma$-cyclodextrins are mentioned. They may be used either singly or as a combination of two or more. A cyclic oligosaccharide may be added at a ratio of preferably from 1 to 15 times, more preferably from 3 to 12 times, even more preferably from 5 to 11 times the mass of the dried green tea extract in the instant black tea.

In addition, one or more of additives such as sweeteners, antioxidants, flavors, fruit extracts, fruit pieces, fruit powders, herbs, organic acids, organic acid salts, inorganic acids, inorganic acid salts, inorganic salts, pH regulators and quality stabilizers may be added as desired to the instant black tea according to the present invention. It is to be noted that the contents of these additives may be appropriately set to the extents that the object of the present invention is not impaired.

The instant black tea according to the present invention is in a form that a small portion of the beverage material required for a cup is packed in the tea bag, and can be taken by placing it in the cup and pouring water or hot water. It is to be noted that the capacity of the cup may be preferably from 180 to 320 mL and the size of the tea bag may be set as needed to suit the capacity of the cup.

In the instant black tea according to the present invention, the content of solids in the beverage material may be preferably 90 mass % or higher, more preferably 95 mass % or higher, even more preferably 98 mass % or higher from the viewpoints of preservation, microorganism prevention, and handling ease. No particular limitation is, however, imparted to the upper limit of the content of solids in the beverage material. The term "the content of solids in the beverage material" as used herein means a residue remaining after eliminating volatiles by drying the beverage material for 3 hours in an electric constant-temperature drier controlled at 105° C.

The instant black tea according to the present invention can be produced, for example, by a process including the following step (a) or (b):

Step (a): a step of blending dried green-tea extract granules with black tea leaves, Step (b): a step of coating a liquid matter containing a green tea extract, to the black tea leaves.

First, a description will be made about a process for the production of the instant black tea by the step (a).

The dried green-tea extract granules are provided. The dried green-tea extract granules may be obtained by drying and granulating at least one green tea extract selected from a green tea extract solution, its concentrate and purified products thereof. Among these, the purified product of the green tea extract solution or its concentrate is preferred as the green tea extract from the viewpoints of further reductions in bitterness and astringency and an improvement in appearance.

The term "green tea extract solution" as used herein means an extract obtained from unfermented tea and subjected to neither concentration nor purification. As an extraction method, it is possible to adopt a known method such as kneader extraction, agitation extraction (batchwise extraction), countercurrent extraction (drip extraction) or column extraction.

As green tea for use in the extraction, tea manufactured from a tea tree selected, for example, from the Genus *Camellia*, e.g., *C*. var. *sinensis* (including the *Yabukita* variety), *C*. var. *assamica* or a hybrid thereof is mentioned. Illustrative are sencha, bancha, gyokuro, tencha, kamairicha, kukicha, bocha, mecha or the like.

The term "concentrated green tea extract solution" as used therein means one obtained by removing a portion of water from a solution extracted from unfermented tea with hot water or a water-soluble organic solvent and containing the non-polymer catechins at an increased concentration, and such a concentrated green tea extract solution can be produced, for example, by a process disclosed in JP-A-59-219384, JP-A-04-020589, JP-A-05-260907, JP-A-05-306279 or the like. It is available in various forms such as solid, aqueous solution and slurry. As the concentrated green tea extract solution, a commercially-available product, for example, such as "POLYPHENONE" (Mitsui Norin Co., Ltd.), "TEAFURAN" (ITO EN, LTD.) or "SUNPHENON" (Taiyo Kagaku Co., Ltd.) may be used.

As "the purified product of the green tea extract solution or its concentrate", one obtained, for example, by any one or a combination of two or more of the following methods (i) to (iv) may be mentioned.

(i) a method that suspends the green tea extract solution or its concentrate (hereinafter called "the green tea extract solution or the like") in water or a mixture of water and a water-soluble organic solvent (for example, ethanol) (hereinafter called "an aqueous solution of organic solvent"), removes the resulting precipitates, and then distills off the solvent.

(ii) a method that brings the green tea extract solution or the like into contact with at least one adsorbent selected from activated carbon, acid clay and activated clay (for example, JP-A-2007-282568).

(iii) a method that subsequent to adsorption of the green tea extract solution or the like on a synthetic adsorbent, brings an aqueous solution of organic solvent into contact with the synthetic adsorbent to desorb the non-polymer catechins (for example, JP-A-2006-160656).

(iv) a method that subsequent to adsorption of the green tea extract solution or the like on a synthetic adsorbent, brings an aqueous solution of organic solvent or a basic aqueous solution (for example, an aqueous solution of sodium hydroxide) into contact with the synthetic adsorbent to desorb the non-polymer catechins, and then brings the desorption eluate into contact with activated carbon (for example, JP-A-2008-079609).

As the green tea extract solution or the like, one subjected to tannase treatment may also be used in the above-described methods (i) to (iv). It is to be noted that the term "tannase treatment" as used therein means to bring the green tea extract solution or its concentrate into contact with an enzyme having tannase activity, and that this tannase treatment can reduce within the above-described range the ratio of gallate forms in the non-polymer catechins. It is also to be noted that as a specific procedure in tannase treatment, a known method may be used and the method described in JP-A-2004-321105 may be exemplified.

As a drying method for the green tea extract solution or the like, freeze drying, spray drying or the like may be used, for example. Further, the granulation method may be either a dry-type method or a wet-type method. From the viewpoint of an optimal efficiency of extraction, wet-type granulation that conducts granulation by using adhesive power of water or a binder is preferred. As the binder, a carbohydrate such as a cyclic oligosaccharide may be used, for example.

Preferred granulation methods include spray drying, freeze drying, fluidized bed granulation, tumbling granulation or the like. These granulation methods may be conducted in combination. As drying temperatures in the respective granulation methods, it is possible to adopt the temperature of, for example, from −50 to 50° C. for freeze drying, from 50° C. to 120° C. for spray drying, from 20 to 50° C. for fluidized bed granulation, and from 20 to 60° C. for tumbling granulation.

Of these, a two-stage method that subsequent to the production of a primary powder by spray drying or freeze drying, a secondary powder is produced by fluidized bed granulation or tumbling granulation is preferred as a granulation method for the green tea extract from the viewpoints of providing improved solubility and preventing caking.

The average particle size of the dried green-tea extract granules may be preferably from 100 to 5,000 μm, more preferably from 150 to 2,000 μm, more preferably from 180 to 1,000 μm, even more preferably from 190 to 500 μm. The granulation into such an average particle size facilitates the dissolution of the non-polymer catechins in water, thereby making it possible to conveniently ingest the non-polymer catechins at high concentration. It is to be noted that the term "average particle size" as used herein means a value as measured in accordance with the sieving test method in JIS Z 8801.

It is preferred to conduct deoxidation treatment such as purging the atmosphere with nitrogen upon performing the granulation processing from the viewpoint of avoiding polymerization, discoloration or the like of the non-polymer catechins in the dried green tea extract.

The dried green-tea extract granules and the black tea leaves are next blended together. It is possible to use, as a blending manner, a known rotating vessel type (horizontal cylinder, V-type, double-cone or cubic) or a known fixed vessel type (ribbon, screw, conical screw, paddle, fluidized bed or Philips blender).

A description will next be made about a process for the production of the instant black tea by the step (b).

A liquid matter containing at least one green tea extract selected from the green tea extract solution, its concentrate and purified products thereof is provided. Such a liquid matter may be an aqueous solution or may contain an organic solvent. After the liquid matter with the green tea extract contained therein is applied to tea leaves, it is dried. As a consequence, the black tea leaves can be coated at surfaces thereof with the dried green tea extract. As a method for applying the liquid matter that contains the green tea extract, the above-described tumbling granulation or fluidized bed granulation may be used. Specifically, it is possible to use a method that includes feeding the solid raw material beforehand in a tumbling granulator or fluidized bed granulator and then spray-coating the liquid matter which contains the green tea extract. Upon conducting the spray-coating, a carbohydrate such as a cyclic oligosaccharide may be used as a binder in combination.

The dried green-tea extract granules and the black tea leaves, or the black tea leaves coated at the surfaces thereof with the dried green tea extract are next sealed in a tea bag. In this manner, the instant black tea according to the present invention can be produced. From the viewpoints of avoiding a caking of the dried green tea extract and a polymerization reaction or discoloration of the non-polymer catechins or the like, during storage, it is preferred to choose a material with high light shielding property and low moisture and low oxygen permeability as a material for packaging tea bags that contain the instant black tea of the present invention sealed therein. Specifically, a bag of an aluminum composite film or aluminum evaporated film, a metal can or the like may be mentioned. Further, it is more preferred to enclose a deoxidant or to conduct nitrogen or carbon dioxide purge packaging, vacuum packaging or the like upon sealing such packed tea bags in a package of such a material.

EXAMPLES (Measurement of the Non-Polymer Catechins)

A sample was subjected to filtration through a filter (0.8 µm), and was then diluted with distilled water. A high-performance liquid chromatograph (model: "SCL-10AVP", manufactured by Shimadzu Corporation) was provided, and was fitted with a liquid chromatograph column packed with octadecyl group-introduced silica gel ("L-COLUMN TM ODS", 4.6 mm in diameter×250 mm; product of Chemicals Evaluation and Research Institute, Japan). The sample was measured at a column temperature of 35° C. by the gradient elution method. A mobile phase, Solution A, was a 0.1 mol/L aqueous solution of acetic acid, and another mobile phase, Solution B, was a 0.1 mol/L solution of acetic acid in acetonitrile. The measurement was conducted under the conditions of 20 µL sample injection volume and 280 nm UV detector wavelength.

(Content of the Non-Polymer Catechins)

After a sample (5 g) was dried for 3 hours in an electric constant-temperature drier at 105° C., its solids mass was measured. From the solids mass and the mass of the non-polymer catechins in the sample (5 g), the content of the non-polymer catechins was determined by the following equation (1):

$$\frac{\text{Mass of the non-polymer catechins in sample (g)}}{\text{Mass of solids obtained by drying sample (g)}} \times 100 \quad (1)$$

(Measurement of Tannin)

Using ethyl gallate as a standard solution, the amount of gallic acid was calculated in terms of the amount of tannin by the ferrous tartrate method (referential publication: "Green Tea Polyphenols", Technology Series for the Effective Utilization of Functional Ingredients for Beverages and Foods, No. 10, Japan Confectionery and Innovative Food Ingredients Research Center).

A sample (5 mL) was stained with the standard solution of ferrous tartrate (5 mL). With a phosphate buffer, the volume of the thus-stained sample was adjusted to 25 mL. Its absorbance was measured at 540 nm, and from a calibration line for ethyl gallate, the amount of tannin was determined.

Preparation of the standard solution of ferrous tartrate: Ferrous sulfate heptahydrate (100 mg) and potassium sodium tartrate (Rochelle salt) (500 mg) were dissolved with distilled water to give a total volume of 100 mL.

Preparation of the phosphate buffer: A 1/15 mol/L solution of disodium hydrogenphosphate and a 1/15 mol/L solution of sodium dihydrogenphosphate were mixed to control pH 7.5.

(Evaluation)

Each instant black tea was evaluated by the following methods.

Based on an infusion (black tea beverage) obtained by infusing the instant black tea in deionized water of 90° C. (200 g), its bitterness and astringency were evaluated by a panel of three experts in accordance with the standards of Table 1. In addition, its tastiness and appearance were also evaluated by the standards of Table 2 and those of Table 3, respectively.

TABLE 1

<Evaluation of bitterness and astringency>

| Rank | Evaluation standards for bitterness | Evaluation standards for astringency |
|---|---|---|
| A | Bitterness is slightly sensed | Astringency is slightly sensed |
| B | Bitterness is sensed a little | Astringency is sensed a little |
| C | Bitterness is sensed | Astringency is sensed |
| D | Bitterness is strong | Astringency is strong |

TABLE 2

<Evaluation of tastiness>

| Rank | Evaluation standards |
|---|---|
| A | tasty |
| B | A little tasty |
| C | Neither tastiness nor unpalatable |
| D | Unpalatable |

TABLE 3

<Evaluation of appearance>

| Rank | Evaluation standards |
|---|---|
| A | Clear |
| B | Slightly turbid |
| C | Significantly turbid |

(Black Tea Leaves)

Each sample of black tea leaves had been subjected to sieve classification, and the one with a size of 1 mm was used. In the selection of black tea leaves, for the measurement of the contents of the non-polymer catechins and tannin in the black tea leaves, the black tea leaves (10 g) was milled twice by using a "KALITA MILL FINE GRIND NO. 1" (manufacture by Kalita Co., Ltd.). Subsequently, classification was applied for 30 seconds by a "RETSCH AS-200" (manufactured by Retsch GmbH). Each sample of black tea leaves (5 g) obtained as described above was extracted for 5 minutes with hot water of 90° C. (500 g). With respect to the extract solution so obtained, the contents of the non-polymer catechins and tannin were measured to determine their mass ratio. The results are shown in Table 4.

TABLE 4

| | Varieties | Content of the non-polymer catechins in black tea leaves | Mass ratio of the non-polymer catechins/ tannin | Size of black tea leaves |
|---|---|---|---|---|
| Black tea leaves A | Nuwara Eliya | 8.3 mass % | 0.64 | 1 mm |
| Black tea leaves B | Uva | 5.9 mass % | 0.32 | 1 mm |
| Black tea leaves C | Dimbula | 3.6 mass % | 0.17 | 1 mm |
| Black tea leaves D | Kenya | 2.0 mass % | 0.10 | 1 mm |

The production processes of the green tea extracts employed in Examples were described hereinafter. Analysis data are shown in Table 5.

Production Example 1

(Production of Dried Green Tea Extract A)

Using deionized water in an amount 30 times by mass as much as green tea leaves, the green tea leaves were extracted at the temperature condition of 90° C. to obtain a green tea extract solution. The resultant green tea extract solution was then dried as it was, whereby a dried green tea extract A was obtained. In the dried green tea extract A, the concentration of the non-polymer catechins was 35 mass %, the mass ratio of the non-polymer catechins/tannin was 0.80, and the ratio of gallate forms in the non-polymer catechins was 52 mass %.

Production Example 2

(Production of Dried Green Tea Extract B)

The dried green tea extract A (200 g) obtained in the Production Example 1 was dispersed in a 40 mass % aqueous solution of ethanol (800 g) under stirring conditions of 250 r/min at 25° C. After acid clay ("MIZUKA ACE #600", product of Mizusawa Chemical Industries, Ltd.; 100 g) was charged, stirring was continued for approx. 10 minutes. The resulting mixture was then filtered through No. 2 filter paper. Activated carbon (8 g) was next added to the filtrate, and the mixture was filtered again through No. 2 filter paper. The filtrate was then refiltered through a 0.2-μm membrane filter to remove turbidity. After ethanol was distilled off at 40° C. and 0.0272 kg/cm$^2$, it was dried to obtain a dried green tea extract B. In the dried green tea extract B, the concentration of the non-polymer catechins was 45 mass-%, the mass ratio of the non-polymer catechins/tannin was 0.85, and the ratio of gallate forms in the non-polymer catechins was 52 mass %.

Production Example 3

(Production of Dried Green Tea Extract C)

The dried green tea extract A (200 g) obtained in the Production Example 1 was dispersed in a 95 mass % aqueous solution of ethanol (800 g) under stirring conditions of 250 r/min at 25° C. After acid clay ("MIZUKA ACE #600", product of Mizusawa Chemical Industries, Ltd.; 100 g) was charged, stirring was continued for approx. 10 minutes. The resulting mixture was then filtered through No. 2 filter paper. Activated carbon (16 g) was next added to the filtrate, and the mixture was filtered again through No. 2 filter paper. The filtrate was then refiltered through a 0.2-μm membrane filter to remove turbidity. After ethanol was distilled off at 40° C. and 0.0272 kg/cm$^2$, it was dried to obtain a dried green tea extract C. In the dried green tea extract C, the concentration of the non-polymer catechins was 61 mass %, the mass ratio of the non-polymer catechins/tannin was 0.96, and the ratio of gallate forms in the non-polymer catechins was 47 mass %.

Production Example 4

(Production of Dried Green Tea Extract D)

After green tea leaves were extracted with hot water at a bath ratio of 20:1, water-insoluble matter was filtered off by a 100-mesh metal mesh to obtain a green tea extract solution α. To the green tea extract solution a, tannase ("TANNASE KTFH", product of Kikkoman Corporation; 500 U/g) was added to give a concentration of 430 ppm. After being allowed to react at 25° C. for 60 minutes, the reaction mixture was heated to inactivate the enzyme so that a "green tea extract base α" was obtained. In the "green tea extract base α", the ratio of gallate forms in the non-polymer catechins was 33 mass %. The "green tea extract base α" (2,400 g) was next passed, under the condition of SV=1 (h$^{-1}$), through a cylindrical column in which a synthetic adsorbent "SP-70" [product of Mitsubishi Chemical Corporation; 600 mL (40 g/L based on the mass of the non-polymer catechins)] was packed, whereby the non-polymer catechins were adsorbed. Purified water (900 g) was then passed, under the condition of SV=1 (h$^{-1}$), through the column to wash the synthetic adsorbent. To desorb the non-polymer catechins, a 30 mass % aqueous solution of ethanol (750 g) was passed, under the condition of SV=1 (h$^{-1}$), through the column to obtain a desorption eluate. In the column, granular activated carbon "TAIKO SGP" (product of Futamura Chemical Co., Ltd.) was then packed in an amount of 30 mass % based on the non-polymer catechins in the desorption eluate. The desorption eluate was then passed through the column to collect a processed solution. Ethanol was distilled off, and subsequently, the drying was conducted to obtain a dried green tea extract D. In the dried green tea extract D, the concentration of the non-polymer catechins was 70 mass %, the mass ratio of the non-polymer catechins/tannin was 1.00, and the ratio of gallate forms in the non-polymer catechins was 29 mass %.

TABLE 5

| | Content of the non-polymer catechins in dried green tea extract | Mass ratio of the non-polymer catechins/tannin in dried green tea extract | Ratio of gallate forms in the non-polymer catechins in dried green tea extract |
|---|---|---|---|
| Dried green tea extract A | 35 mass % | 0.80 | 52 mass % |
| Dried green tea extract B | 45 mass % | 0.85 | 52 mass % |
| Dried green tea extract C | 61 mass % | 0.96 | 47 mass % |
| Dried green tea extract D | 70 mass % | 1.00 | 29 mass % |

Production Example 5

(Production of Granules a of Dried Green Tea Extract)

Added as binders to the dried green tea extract C (7.6 mass %) were a cyclic oligosaccharide A ("SL20", Nihon Shokuhin Kako Co., Ltd., purity: 3.4 mass %; 49.2 mass %) and a cyclic oligosaccharide B ("CAVAMAX", Cyclochem Co., Ltd., purity: 100 mass %; 18 mass %). The mixture was then balanced with erythritol (Mitsubishi-Kagaku Foods Corporation) to a total amount of 500 g. Using a pan-type granulator (inner diameter: 540 mm, depth: 373 mm, "DPZ-01", AS ONE Corporation) as a tumbling granulator, those materials were granulated at 25° C., an inclination of 45° with respect to the horizon, and a rotating speed of 22 rpm. Water was carefully sprayed into the pan-type granulator until granules with from 0.1 to 0.5 mm of particle size were obtained. The granules were next taken out and dried for 4 hours in a reduced-pressure drier controlled at 25° C. The granules so obtained were classified by a 60-mesh screen (Tyler Standard Sieve, aperture: 0.246 mm). The passed granules were next classified by a 100-mesh screen (aperture: 0.147 mm), and the granules remaining on the 100-mesh screen were collected. Those granules were used as the granules a of dried green tea extract in Example 1.

Production Example 6

(Production of Granules b to g of Dried Green Tea Extract)

Granules b to g of dried green tea extract were produced by a similar procedure as in Production Example 5, except that the respective ingredients were blended in the proportions shown in Table 6.

TABLE 6

| | Kinds of granules of dried green tea extract | a | b | c | d | e | f | g |
|---|---|---|---|---|---|---|---|---|
| Formulations (mass %) | Dried green tea extract A | — | — | — | — | — | 12 | — |
| | Dried green tea extract B | — | — | — | 10 | — | — | — |
| | Dried green tea extract C | 7.6 | 7 | — | — | 8.4 | — | 8 |
| | Dried green tea extract D | — | — | 6.6 | — | — | — | — |
| | Cyclic oligosaccharide A | 49.2 | 49.2 | 49.2 | 49.2 | 49.2 | 49.2 | 49.2 |
| | Cyclic oligosaccharide B | 18 | 18 | 18 | 18 | 18 | 18 | 18 |
| | Erythritol | Balance | Balance | Balance | Balance | Balance | Balance | Balance |
| | Total amount | 100 | 100 | 100 | 100 | 100 | 100 | 100 |
| | The non-polymer catechins in granules (mass %) | 4.64 | 4.27 | 4.62 | 4.50 | 5.12 | 4.20 | 4.88 |
| | Content of tannin in granules (mass %) | 4.83 | 4.45 | 4.62 | 5.29 | 5.34 | 5.25 | 5.08 |
| | Mass ratio of the non-polymer catechins/tannin in granules | 0.96 | 0.96 | 1.00 | 0.85 | 0.96 | 0.80 | 0.96 |

Examples 1 to 4 & Comparative Examples 1 to 3

Instant black teas were each obtained by charging the corresponding granules of dried green-tea extract shown in Table 6 and the corresponding black tea leaves shown in Table 4 into a V-type micromixer ("MODEL S-3", manufactured by Tsutsui Scientific Instruments Co., Ltd.), subjecting them to powder blending, and then sealing the blended powder (13 g) in an envelop-shaped tea bag (40 mm×150 mm) made of a non-woven fabric in which polyester long fibers and polyethylene long fibers together with are spun.

The instant black teas obtained as described above were each infused for 2 minutes in hot water of 90° C. (200 g). After the infusion (black tea beverage) was analyzed, its sensory test was performed. The results are shown in Table 7.

TABLE 7

| | | Examples | | | | Comp. Examples | | |
|---|---|---|---|---|---|---|---|---|
| | | 1 | 2 | 3 | 4 | 1 | 2 | 3 |
| Formulations (mass %) | Black tea leaves A: Nuwara Eliya | — | 15 | — | — | — | — | — |
| | Black tea leaves B: Uva | 15 | — | 15 | 15 | — | 15 | — |
| | Black tea leaves C: Dimbula | — | — | — | — | — | — | 15 |
| | Black tea leaves D: Kenya | — | — | — | — | 15 | — | — |
| | Granules a of dried green tea extract | 85 | — | — | — | — | — | — |
| | Granules b of dried green tea extract | — | 85 | — | — | — | — | — |
| | Granules c of dried green tea extract | — | — | 85 | — | — | — | — |
| | Granules d of dried green tea extract | — | — | — | 85 | — | — | — |
| | Granules e of dried green tea extract | — | — | — | — | 85 | — | — |
| | Granules f of dried green tea extract | — | — | — | — | — | 85 | — |
| | Granules g of dried green tea extract | — | — | — | — | — | — | 85 |
| | Total | 100 | 100 | 100 | 100 | 100 | 100 | 100 |
| Analysis data | Mass ratio of the non-polymer catechins/tannin in extract solution of black tea leaves | 0.32 | 0.64 | 0.32 | 0.32 | 0.10 | 0.32 | 0.17 |

TABLE 7-continued

|  |  | Examples | | | | Comp. Examples | | |
| --- | --- | --- | --- | --- | --- | --- | --- | --- |
|  |  | 1 | 2 | 3 | 4 | 1 | 2 | 3 |
|  | The non-polymer catechins in black tea leaves (mass %) | 5.9 | 8.3 | 5.9 | 5.9 | 2.0 | 5.9 | 3.6 |
|  | Mass ratio of the non-polymer catechins/tannin in dried green tea extract | 0.96 | 0.96 | 1.00 | 0.85 | 0.96 | 0.80 | 0.96 |
|  | Content of the non-polymer catechins in granules (mass %) | 4.64 | 4.27 | 4.62 | 4.50 | 5.12 | 4.20 | 4.88 |
|  | Ratio of gallate forms in the non-polymer catechins in granules (mass %) | 47 | 47 | 29 | 52 | 47 | 52 | 47 |
|  | Content of the non-polymer catechins per 13 g of beverage material for instant black tea (g) | 0.63 | 0.63 | 0.63 | 0.61 | 0.61 | 0.58 | 0.61 |
|  | Content of tannin per 13 g of beverage material for instant black tea (g) | 0.89 | 0.74 | 0.87 | 0.94 | 0.98 | 0.94 | 0.97 |
|  | Mass ratio of the non-polymer catechins/tannin in beverage material for instant black tea | 0.71 | 0.85 | 0.72 | 0.65 | 0.62 | 0.62 | 0.63 |
|  | Content of the non-polymer catechins in infusion when instant black tea needed for a cup was infused for 2 minutes in hot water of 90° C. (200 g) (mg/100 mL) | 294 | 295 | 295 | 295 | 293 | 293 | 294 |
| Evaluation | Bitterness | B | A | A | B | C | B | C |
|  | Astringency | C | A | B | C | D | D | C |
|  | Tastiness | B | B | B | C | D | D | C |
|  | Appearance of infusion | B | A | B | B | C | B | B |

It has been found that an instant black tea, which is further reduced in bitterness and astringency and is excellent in the appearance of an infusion despite the inclusion of the non-polymer catechins at high concentration, is obtained by placing black tea leaves and a dried green tea extract as a beverage material in a tea bag, in which the content mass ratio of the non-polymer catechins/tannin in the beverage material is controlled to a specific value.

The invention claimed is:

1. An instant black tea comprising a beverage material comprising black tea leaves and a dried green tea extract which is sealed in a tea bag,
wherein a mass ratio of the non-polymer catechins/tannin in the beverage material is from 0.65 to 0.95.

2. The instant black tea according to claim 1, wherein the mass ratio of the non-polymer catechins/tannin in the black tea leaves is from 0.2 to 0.9.

3. The instant black tea according to claim 1, wherein the black tea leaves are at least one member selected from the group consisting of Nuwara Eliya, Uva and Dimbula.

4. The instant black tea according to claim 1, wherein the black tea leaves are from 0.5 to 2 mm in size.

5. The instant black tea according to claim 1, wherein a mass ratio of the non-polymer catechins/tannin in the dried green tea extract is from 0.83 to 1.3.

6. The instant black tea according to claim 1, wherein a ratio of gallate forms in the non-polymer catechins in the dried green tea extract is from 5 to 55 mass %.

7. The instant black tea according to claim 1, wherein, when infusing for 2 minutes in 200 g of hot water of 90° C., a content of the non-polymer catechins in an infusion is from 200 to 600 mg/100 mL.

* * * * *